J. C. SCHENK.
TIRE LOCK.
APPLICATION FILED AUG. 7, 1919.
1,386,367.  Patented Aug. 2, 1921.
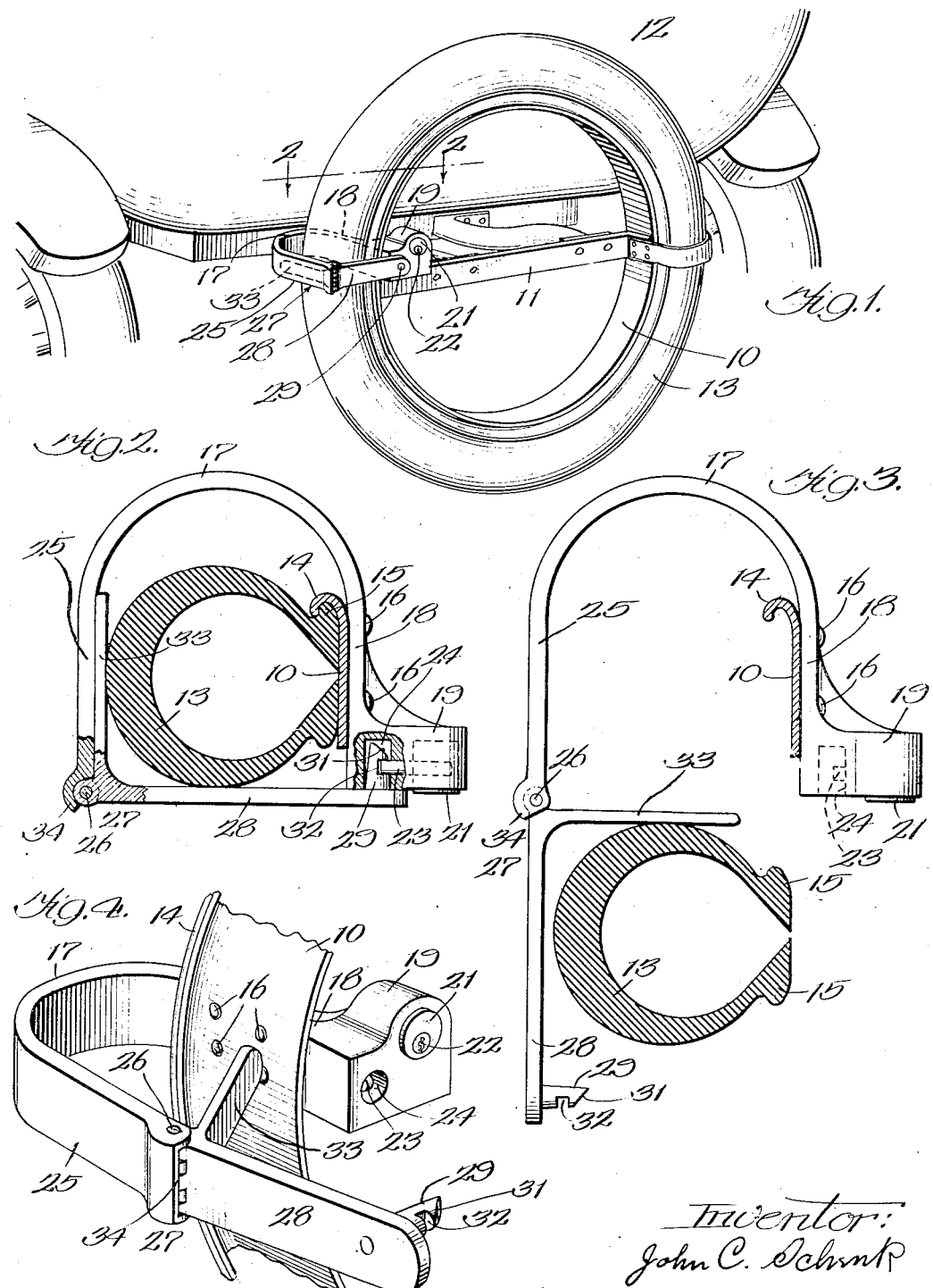

UNITED STATES PATENT OFFICE.

JOHN C. SCHENK, OF CHICAGO, ILLINOIS.

TIRE-LOCK.

1,386,367.  Specification of Letters Patent.  Patented Aug. 2, 1921.

Application filed August 7, 1919. Serial No. 315,797.

*To all whom it may concern:*

Be it known that I, JOHN C. SCHENK, a citizen of the United States, residing at Chicago, in the county of Cook and State of Illinois, have invented certain new and useful Improvements in Tire-Locks, of which the following is a specification.

My invention relates to tire locks, and has for its primary object the provision of an improved lock of this class, for attachment, for example, to the spare tire racks of automobiles, whereby the act of positioning the tire in its rack automatically locks it thereto. A further object lies in the provision of an extremely compact automatic tire lock that shall add a minimum of bulk to the thickness of the tire.

Other objects and advantages of the invention will appear from the following description, taken in conjunction with the accompanying drawings which form a part of this specification and illustrate the preferred embodiment of the invention.

In the drawings:

Figure 1 is a perspective view illustrating fragmentarily the rear of an automobile with its spare tire rack, and showing this invention holding a tire locked on the rack.

Fig. 2 is a top plan view of the invention, showing the tire and rack in section approximately on line 2—2 of Fig. 1, and illustrating in dotted lines that form of the invention intended for use with strongly inflated tires.

Fig. 3 illustrates the parts of Fig. 2 in open position.

Fig. 4 is a perspective view of the invention in partially opened position, with the tire removed and part of the rack broken away.

Reference numeral 10 indicates a well-known form of tire rack, which, by means of any suitable bracket 11, is secured to an automobile 12. At 13 is designated the tire to be locked upon rack 10. The usual flange 14 is formed on the inner edge of rack 10 to receive the inner bead 15 of the tire. Obviously, my invention is adapted for use with various forms of tire racks, but in the present drawings that type of rack is shown which requires axial movement of a tire in mounting it upon or taking it from the rack.

By means of rivets 16, a substantially U-shaped lock frame 17 is fixed with the inner face of its inner leg 18 lying against the inner surface of the tire rack 10. The outer extremity of leg 18 of the U-frame is enlarged to form a lock casing 19 within which is positioned any suitable form of key controlled lock 21, the key hole of which is shown at 22; this lock comprising a locking bolt 23 normally standing with its outer end in a catch block recess 24 provided in the lock casing.

In that form of my invention adapted for locking deflated tires, the outer leg 25 of U-frame 17 is preferably a straight piece of metal paralleling the inner leg 18 and carrying at its outer extremity a pivot pin 26 upon which is mounted for oscillation a bell crank generally indicated by numeral 27. The bell crank 27 comprises a long straight arm 28 extending across the opening of the U-frame and overlapping the inner leg thereof and the catch block recess 24. Upon the free end of arm 28 is fixed a catch block 29 positioned to removably enter the catch block recess and having its extremity beveled as at 31 so that, when the catch block enters its recess in the lock casing, the surface 31 will act as a cam forcing bolt 23 outwardly of the catch block recess until the catch block is fully seated in the latter, whereupon, by means of a spring not shown, but forming a well-known part of locks of this type, the locking bolt 23 is forced into a catch block aperture 32 provided for its reception. The catch block may only be removed from its recess by key controlled manipulation of lock 22 and its bolt 23. It is thus seen that the use of a key is not necessary for locking this invention, inasmuch as the catch block and locking bolt will snap into locking relation when the catch block is fully seated in its recess. In that form of the bell crank adapted for use in my invention to lock deflated tires, the other portion of bell crank 27 comprises a straight arm 33 standing at right angles to arm 28 and somewhat shorter than the latter, but of sufficient length, however, to stand in the path of a tire being inserted through the opening of the frame 17. In the normal, or locked position of the parts, the arm 33 contacts with and lies along the inner face of the outer leg 25 of the frame, that outer leg, therefore, limiting oscillation of the bell crank in a counter-clockwise direction as viewed in Figs. 2 and 3. Clockwise rotation of the bell crank is limited to a right angle by means of a stop 34 formed on the extremity of the outer leg of the U-frame, this stop being arranged so that arm 28 of the bell crank strikes it when the bell crank, swinging outwardly of the frame—that is, in a clockwise direction as viewed in Figs. 2 and 3—has moved through 90 degrees. The limitations of oscillatory movement of the bell crank are illustrated in full lines in Figs. 2 and 3, Fig. 2 showing the normal, locked position of the parts, and Fig. 3 illustrating them in fully opened position.

It is to be understood that the present invention is adaptable for locking onto a tire rack a tire mounted on a demountable steel rim of well known form upon which automobile owners customarily mount an inflated tire for the spare. Inasmuch as such demountable rim and inflated tire forms no part of the present invention, and are well known articles, they are not illustrated in the drawings. For use in connection with inflated tires the outer leg 25 and the arm 33 may be curved outwardly to better conform to the contour of the tire instead of being straight as shown.

In the operation of the invention, and considering a tire as being locked in frame 17, as viewed in Figs. 1 and 2, the operator inserts his key in the keyhole 22 and operates lock 21 to withdraw locking bolt 23 from its seated position in aperture 32 of catch block 29. The tire is now withdrawn from the invention by pulling it against bell crank arm 28 and outwardly through the opening of the substantially U-shaped frame. Obviously, in this removal of the tire, the inner arm of the bell crank will, for a portion of its travel, move toward the center of the lock frame. This inward movement of the straight bell crank arm 33 will merely cause a depression in the yielding material of which the tire is composed without offering any obstruction to the removal of the tire.

When the tire has been removed from the lock, as seen in Fig. 3, the arm 33, as the case may be, projects across the opening of the U-frame and obstructs the same. Stop 34 is provided to prevent further clockwise movement of bell crank 27, so that, in inserting a tire into the lock, the tire must strike and push inward the inner arm 33 of the bell crank. Such contact between the inner arm of the bell crank and a tire being inserted into the frame will of course move arm 28 and catch block 32 into normal position, so that, when the tire is fully inserted in the frame, the catch block snaps automatically into lock relation with the locking bolt 23.

Obviously, the exact proportions of the present invention may be varied to accommodate different tires, it being intended for adaptation to the locking of tires of different dimensions.

I claim:

A tire lock comprising a substantially U-shaped member proportioned to accommodate a tire and adapted to be attached by one leg to a tire carrier, a key releasable lock carried at the end of one leg of said member, a bell crank hinged upon the opposed end of the other leg of said member, one arm of said bell crank being adapted to swing between the legs of said member from a transverse position between the ends of said legs to a position parallel with said legs, the other arm of said bell crank being adapted to be swung by said first mentioned arm from a position in longitudinal alinement with one of said legs to a transverse position closing the space between the ends of said legs, and means carried by the end portion of said last mentioned arm for lockingly engaging with said lock whereby a tire disposed between the legs of said U-shaped member is locked against removal.

JOHN C. SCHENK.